(12) United States Patent
Maor et al.

(10) Patent No.: US 8,104,485 B2
(45) Date of Patent: Jan. 31, 2012

(54) LICE COMB

(75) Inventors: Moshe Maor, Perth (AU); Edward J. Khoury, Perth (AU); Robert C. A. Culley, Perth (AU)

(73) Assignees: David J. Schwartz, Perth (AU); Moshe Maor, Perth (AU)

( * ) Notice: Subject to any disclaimer, the term of this patent is extended or adjusted under 35 U.S.C. 154(b) by 395 days.

(21) Appl. No.: 12/377,674

(22) PCT Filed: Aug. 23, 2007

(86) PCT No.: PCT/AU2007/001202
§ 371 (c)(1),
(2), (4) Date: Feb. 17, 2009

(87) PCT Pub. No.: WO2008/022387
PCT Pub. Date: Feb. 28, 2008

(65) Prior Publication Data
US 2010/0252060 A1 Oct. 7, 2010

(30) Foreign Application Priority Data
Aug. 23, 2006 (AU) ................ 2006904564

(51) Int. Cl.
*A45D 24/16* (2006.01)
*A45D 24/04* (2006.01)
(52) U.S. Cl. ...................................... 132/126
(58) Field of Classification Search ........... 132/120, 132/126, 129, 137, 138, 142
See application file for complete search history.

(56) References Cited

U.S. PATENT DOCUMENTS

| 2,626,618 | A | * | 1/1953 | Collison | ............ 132/136 |
| 4,612,945 | A | * | 9/1986 | Bachrach | ............ 132/137 |
| 4,807,652 | A | * | 2/1989 | Bachrach | ............ 132/137 |
| 5,873,374 | A | | 2/1999 | Sanz | |
| 6,494,214 | B1 | | 12/2002 | Coldicott | |
| 7,089,945 | B1 | | 8/2006 | Barge | |

FOREIGN PATENT DOCUMENTS

| EP | 0894450 B | 5/2003 |
| EP | 1570761 A | 9/2005 |
| FR | 2677234 A | 12/1992 |
| GB | 2396104 A | 6/2004 |
| WO | 0010420 A | 3/2000 |
| WO | 2006097750 A | 9/2006 |
| WO | 2006129930 A | 12/2006 |

OTHER PUBLICATIONS

International Search Report for PCT/AU2007/001202, dated Sep. 19, 2007.

* cited by examiner

*Primary Examiner* — Rachel Steitz
(74) *Attorney, Agent, or Firm* — Bachman & LaPointe, P.C.

(57) ABSTRACT

A lice comb (10) comprising a plurality of parallel teeth (12) having upper surfaces (16) and lower surfaces (18). Each pair of adjacent teeth (12) includes a first set of projections (22) on a side surface (24) of one tooth and a second set of projections (26) on a side surface (28) of the adjacent tooth. The first set of projections (22) are provided along at least a portion of the length of the tooth such that hair moving downwardly between the pair of teeth (12) passes through gaps (32) defined between the first set of projections (22). The second set of projections (26) are interspersed between and in a direction toward the lower surface (18) of the teeth (12) such that the strands of hair passing through the gaps (32) are deflected in a direction parallel to the teeth (12) in use by the second set of projections (26).

20 Claims, 6 Drawing Sheets

DETAIL A

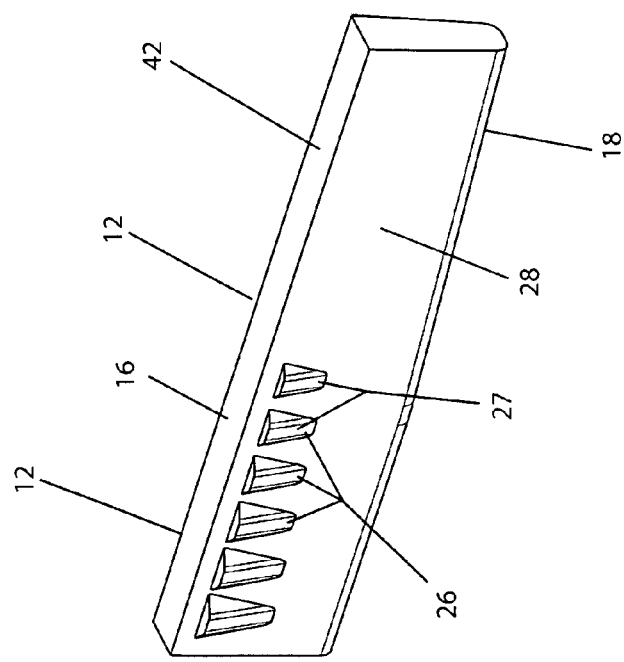
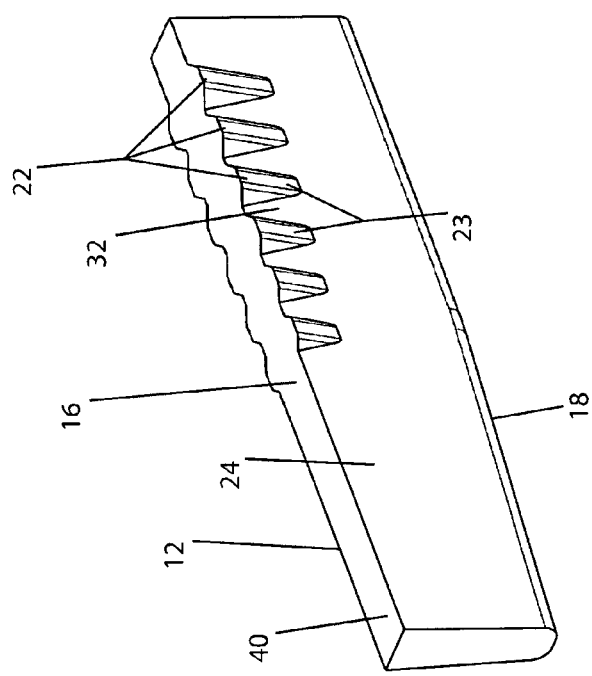

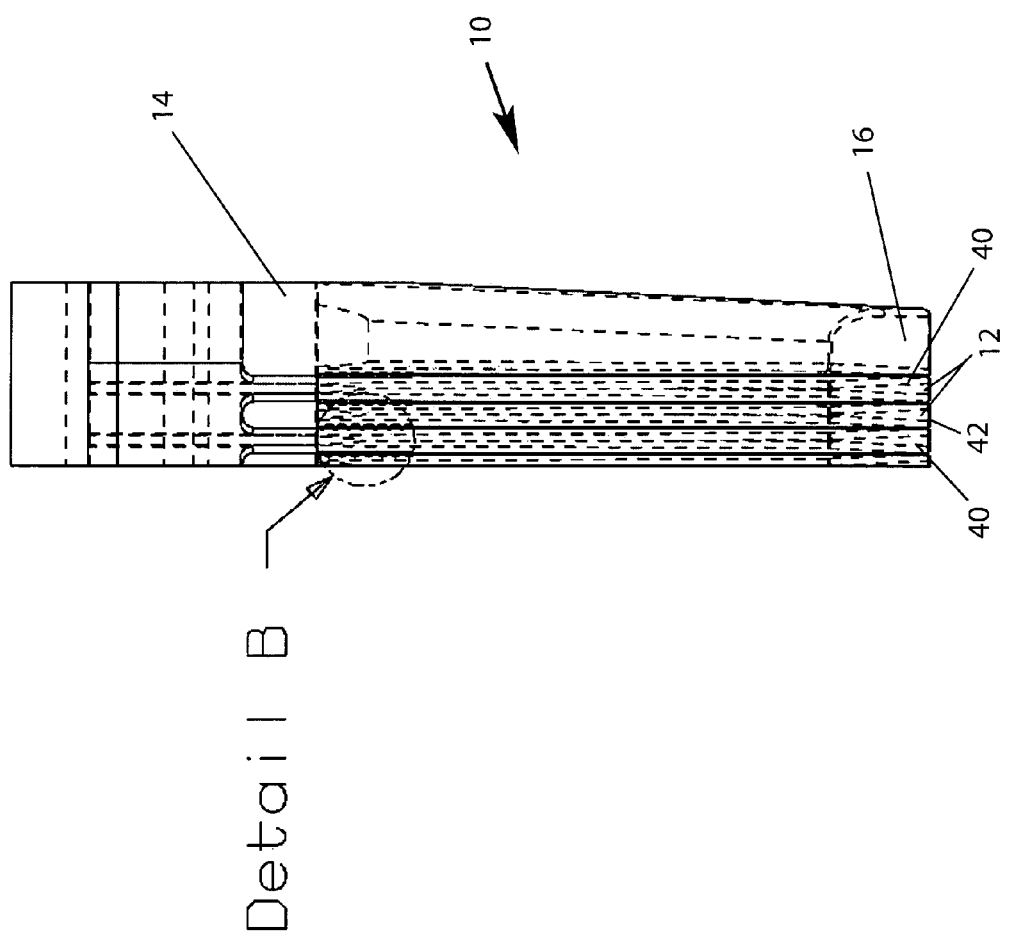

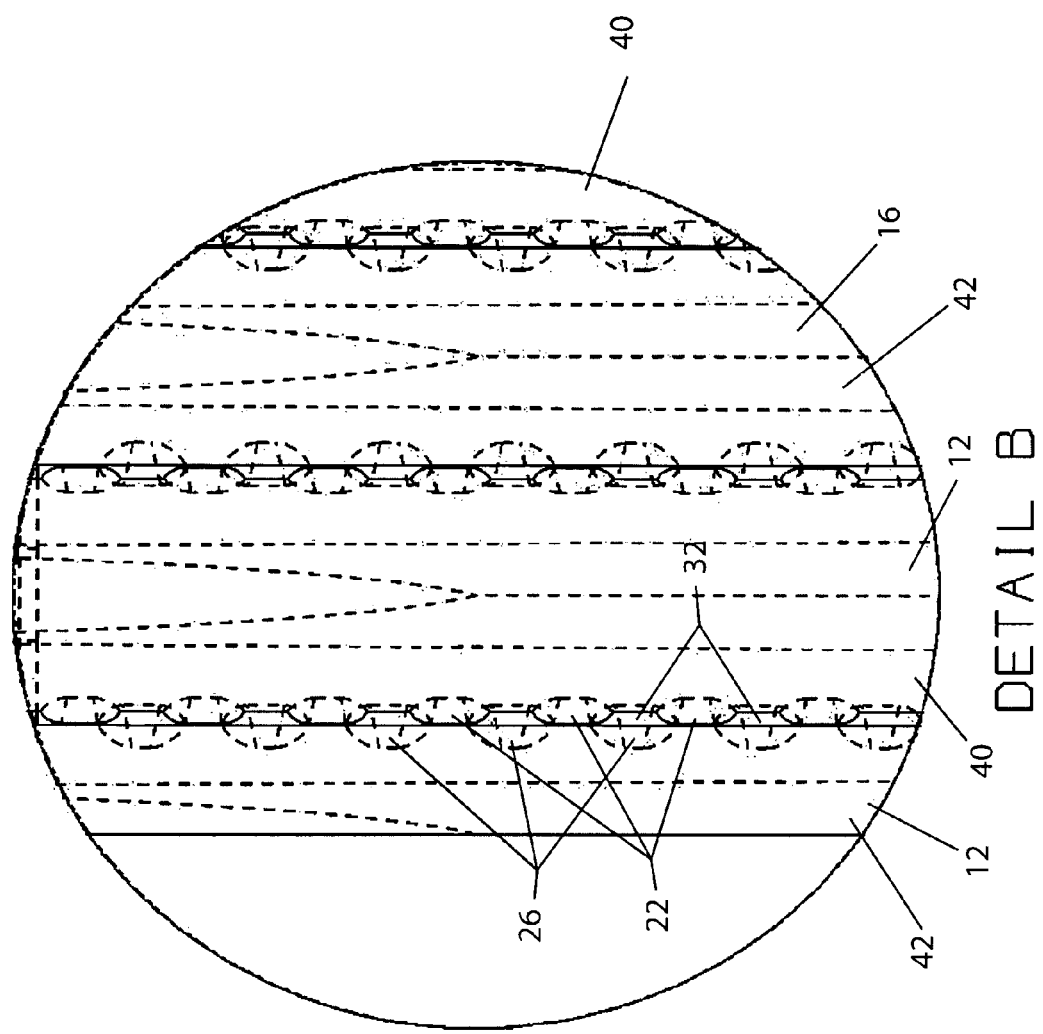

LICE COMB

FIELD OF THE INVENTION

The present invention relates to a lice comb.

BACKGROUND OF THE INVENTION

Many efforts have been made at producing a comb that effectively removes lice from hair. Such combs have utilised a variety of methods to remove and, in the case of some combs, kill the lice. Due to the fact that the lice eggs are smaller in size than the lice and are physically attached to the hair, removal of the lice eggs by combing is more difficult to achieve.

The present invention attempts to overcome at least in part the aforementioned problem of removing both lice eggs and lice with a lice comb.

SUMMARY OF THE INVENTION

In accordance with one aspect of the present invention there is provided a lice comb comprising a plurality of parallel teeth having upper surfaces and lower surfaces, the lower surfaces being adjacent, in use, the base of the hair being combed;

wherein each pair of adjacent teeth includes a first set of projections on a side surface of the first of said pair of adjacent teeth and a second set of projections on an adjacent side surface of the second of said pair of adjacent teeth;

wherein the first set of projections are provided along at least a portion of the length of the tooth such that hair moving downwardly between the pair of teeth passes through gaps defined between the first set of projections, and wherein the second set of projections are provided interspersed between and offset in a direction toward the lower surface of the teeth such that the strands of hair passing through the gaps are deflected in a direction parallel to the teeth in use by the second set of projections.

Preferably the first set of projections comprise a plurality of parallel ribs extending from the upper surface of the tooth towards the lower surface of the tooth and the second of projections comprise a plurality of parallel ribs extending from a point below the upper surface of the tooth towards the lower surface of the tooth.

Preferably the cross sectional size of the projections of the first set reduces from the upper surface towards the lower surface. Also, the cross sectional size of the projections of the second set preferably reduces from the upper surface towards the lower surface.

In one embodiment, the projections of the first set are trapezoidal in cross sectional shape. Preferably the projections of the first set are spaced such that the widths thereof are larger than the widths of the trapezoidal gaps defined between the projections. In a preferred embodiment, the projections of the second set are also trapezoidal in cross sectional shape.

In a preferred embodiment, the space between adjacent ribs of the first and second sets of projections increases towards the outer end of the teeth.

Preferably, the length and width of each projection of the first of projections progressively decreases toward the outer end of the teeth and the length and width of each projection of the second of projections progressively decreases toward the outer end of the teeth.

Advantageously, the teeth are provided as a first set of teeth and a second set of teeth, the teeth of the first set being interleaved with the teeth of the second set such that each tooth of the first set is located between a pair of teeth of the second set.

Preferably, each tooth of the first set of teeth includes the first set of projections on both side surfaces and each tooth of the second set of teeth includes the second set of projections on both side surfaces.

BRIEF DESCRIPTION OF THE DRAWINGS

The present invention will now be described, by way of example, with reference to the accompanying drawings, in which:

FIG. 3b is a perspective view of one of the teeth of FIG. 3a;

FIG. 3c is a perspective view of the other tooth of FIG. 3a;

FIG. 4 is a top view of the lice comb of FIG. 1; and

FIG. 5 is a close up of 'Detail B' of FIG. 4.

DESCRIPTION OF THE PREFERRED EMBODIMENTS

Figure 1:
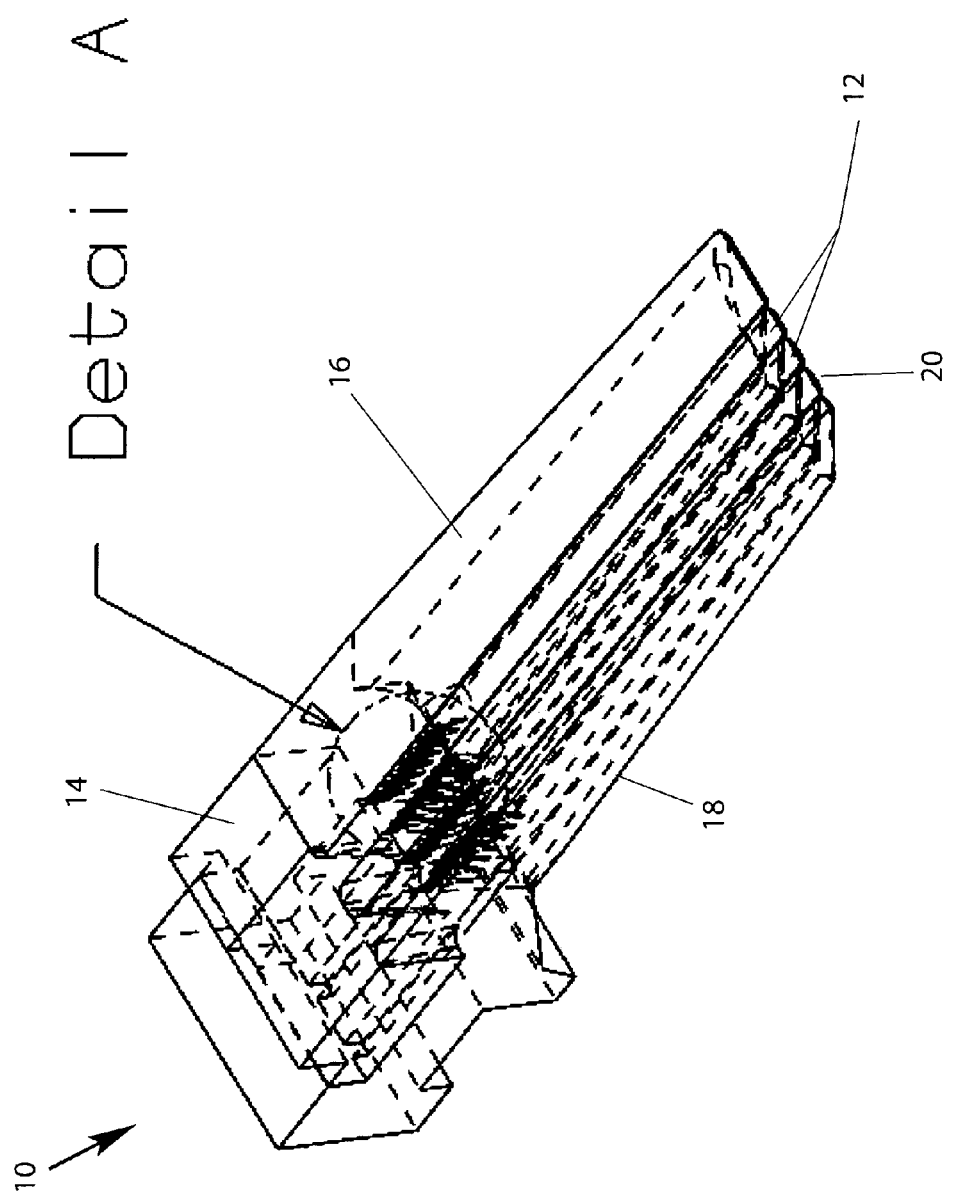
FIG. 1 is an upper perspective view of a lice comb in accordance with the present invention.
Figure 2:
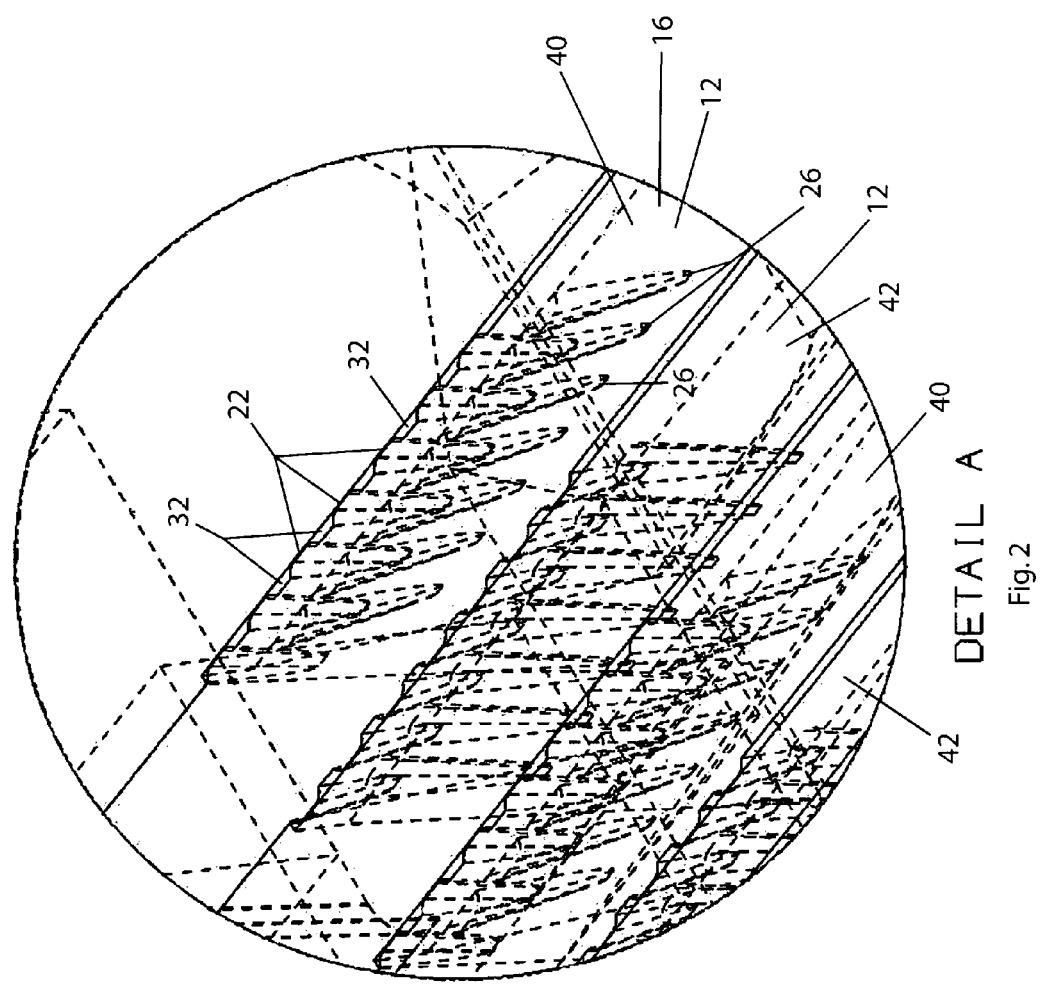
FIG. 2 is a close up of 'Detail A' of the teeth of the lice comb of FIG. 1.

Referring to the Figures, there is shown a lice comb 10 including a plurality of teeth 12. The teeth 12 are arranged parallel to and extending from a base portion 14 of the lice comb 10. Each tooth 12 has an outer end 20 remote from the base portion 14.

The teeth 12 each include an upper surface 16 and a lower surface 18. The lice comb 10 is used in a known manner by holding the teeth 12 generally parallel to the surface to be combed with the lower surface 18 adjacent the surface to be combed and moving the lice comb 10 in a direction generally parallel to the teeth 12. The strands of hair enter between the outer ends 20 of the pairs of adjacent teeth 12 and then slide downwardly between the pairs of adjacent teeth 12 as the lice comb 10 moves away from the base of the hair. The movement of the hair strands sliding through between the pairs of adjacent teeth 12 from the upper surfaces 16 toward the lower surfaces 18 performs the action of separating lice and eggs from the hair.

In the embodiment shown in the drawings, the teeth 12 comprise a first set of teeth 40 and a second set of teeth 42. The first and second sets of teeth 40 and 42 are interleaved such that each tooth of the first set of teeth 40 is located between a pair of teeth of the second set 42 and vice versa. The first and second set of teeth 40 and 42 may be constructed as separate elements and placed together in use with the teeth interleaved as described above.

Each tooth 12 of the first set of teeth 40 includes a set of projections 22 of a first configuration on a first side surface 24. Each tooth 12 of the first set of teeth 40 also includes a set of projections 22 of the first configuration on a second side surface 28. Each tooth of the second set of teeth 42 includes a set of projections 26 of a second configuration on the first side surface 24. Each tooth 12 of the second set of teeth 42 also includes a set of projections 26 of the second configuration on the second side surface 28. Each pair of adjacent teeth 12 therefore include the first set of projections 22 and the second set of projections 26 on adjacent side surfaces 24 and 28.

Each of the projections of the first set of projections 22 comprises a rib 23 extending from the upper surface 16 towards the lower surface 18. Each rib 23 is of generally trapezoidal cross section and tapers downwardly such that the cross sectional size reduces in a direction towards the second surface 18.

The first set of projections 22 are spaced at regular distances along at least a portion of the length of the teeth 12 such that a plurality of gaps 32 are defined between the first set of projections and the edge of the upper surface 16 of the adjacent tooth 42. Each of the gaps 32 are also generally trapezoidal in cross section such that the space between the upper surfaces 16 of adjacent teeth 12 is narrowest adjacent the projections 22. Preferably, the first set of projections 22 are spaced such that the widths of the trapezoidal teeth 12 are wider than the widths of the trapezoidal gaps 32.

The second set of projections 26 are also in the shape of trapezoidal cross sectioned ribs 27 tapering in cross sectional size towards the lower surface 18 of the tooth 12. The second set of projections 26 are also provided at regular intervals along the length of the tooth 12 but are interspersed between the first set of projections 22 and are offset downwardly from the upper surface 16. That is, the second set of projections 26 are arranged below the gaps 32. Preferably, the cross sectional trapezoidal shape of the teeth 12 of the second set of projections 26 is equivalent to that of the adjacent first set of projections 22.

Also, the length of both the ribs 23 of the first set of projections 22 and the ribs 27 of the second set of projections 26 are progressively shorter in length and narrower in width towards the outer ends of the teeth 12. This can be seen in FIGS. 3*b* and 3*c*. This results in the space between each adjacent pair of projections 23 and 27 becoming progressively greater closer to the outer ends of the teeth 12. This arrangement allows for the first and second set of projections 22 and 26 to work effectively on hair of different thickness. As hair moves through between the teeth 12 from the outer ends 20 towards the base portion 14, thinner hair will move further towards the base portion 14 before the hair strands engage with the first and second set of projections 22 and 26 and slide downwardly between the teeth 12. Relatively thicker hair will engage with the projections 22 and 26 further from the base portion 14 and then slide downwardly between the teeth 12.

Figure 3A:
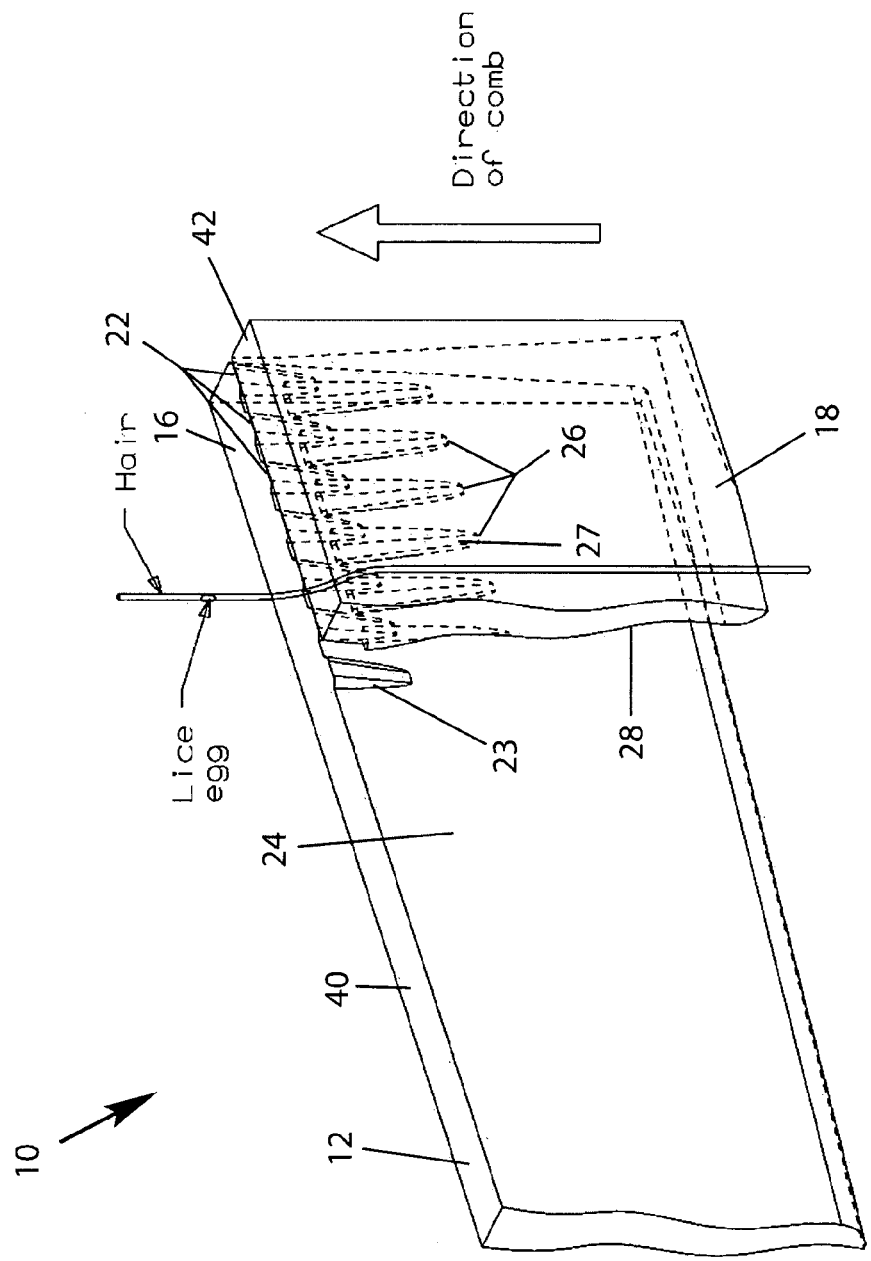
FIG. 3a is an upper perspective view of a pair of teeth of the lice comb of FIG. 1.

In use, when strands of hair are pulled downwardly between teeth 12, the strands of hair will, adjacent the upper surface 16 of the teeth 12, be forced to pass between the first set of projections 22. That is, through the gaps 32. The arrangement of the second set of projections 26 below the gaps 32 however, will cause the hair strands to be deflected around the projections of the second set of projections 26 in a direction parallel to the direction of the teeth 12, as shown in FIG. 3.

In a standard lice comb, the edges of the adjacent teeth through which hair strands pass are generally parallel. The success of removal of lice eggs passing through the teeth is therefore dependent on the orientation of the egg at the point it moves between the teeth. If the lice is on a side of the hair adjacent either of the teeth, it will contact the teeth and may be dislodged. However, if the egg is on a side of the hair facing along the length of the teeth, it is more likely to simply pass through the gap between the teeth without contacting the teeth.

In the present invention, the deflection of the hair will cause the strands of hair to be pulled through narrowest portions of the gaps 32, in which any eggs oriented on the side of the hair strand adjacent either of the teeth 12 or the projection 22 will contact the teeth 12. If an egg is located on a side of the hair opposite the projection 22 (such as the egg shown in FIG. 3) and is pulled through the gap 32, it will come into contact with the projection 26. Such an arrangement improves the chances of a lice egg coming into contact with the teeth 12 and thereby being removed.

Modifications and variations as would be apparent to a skilled addressee are deemed to be within the scope of the present invention. For example, in the embodiment shown, the teeth 12 comprise a first set of teeth 40 having a set of projections 22 of the first configuration on both side surfaces and a second set of interspersed teeth 42 having a set of projections 22 of the second configuration on both side surfaces. In an alternative embodiment, the teeth 12 may all be of the same configuration having a set of projections of the first configuration on one side surface and a set of projections of the second configuration on the opposite side surface. While the embodiment shown in the drawings is expected to result in easier manufacture, this alternative embodiment would still result in each pair of adjacent teeth having the projections of the first and second configurations on adjacent sides.

The invention claimed is:

1. A lice comb comprising a plurality of parallel teeth having upper surfaces and lower surfaces, the lower surfaces being adjacent, in use, the base of the hair being combed;
   wherein each pair of adjacent teeth includes a first set of projections on a side surface of the first of said pair of adjacent teeth and a second set of projections on an adjacent side surface of the second of said pair of adjacent teeth;
   wherein the first set of projections are provided along at least a portion of the length of the tooth such that hair moving downwardly between the pair of teeth passes through gaps defined between the first set of projections, and wherein the second set of projections are provided interspersed between the first set of projections and offset from the upper surface in a direction toward the lower surface of the teeth such that the strands of hair passing through the gaps are deflected in a direction parallel to the teeth in use by the second set of projections.

2. A lice comb in accordance with claim 1, wherein the first set of projections comprise a plurality of parallel ribs extending from the upper surface of the tooth towards the lower surface of the tooth.

3. A lice comb in accordance with claim 2, wherein the second set of projections comprise a plurality of parallel ribs extending from a point below the upper surface of the tooth towards the lower surface of the tooth.

4. A lice comb in accordance with claim 2, wherein the cross sectional size of the projections of the first set reduces from the upper surface towards the lower surface.

5. A lice comb in accordance with claim 4, wherein the cross sectional size of the projections of the second set reduces from the upper surface towards the lower surface.

6. A lice comb in accordance with claim 4, wherein the projections of the first set are trapezoidal in cross sectional shape.

7. A lice comb in accordance with claim 6, wherein the projections of the first set are spaced such that the widths thereof are larger than the widths of the trapezoidal gaps defined between the projections.

8. A lice comb in accordance with claim 6, wherein the projections of the second set are trapezoidal in cross sectional shape.

9. A lice comb in accordance with claim 3, wherein the space between adjacent ribs of the first and second sets of projections increases towards the outer end of the teeth.

10. A lice comb in accordance with claim 9, wherein the respective length and width of each projection of the first set of projections progressively decrease projection-by-projection toward the outer end of the teeth.

11. A lice comb in accordance with claim 10, wherein the respective length and width of each projection of the second set of projections progressively decrease projection-by-projection toward the outer end of the teeth.

12. A lice comb in accordance with claim 1, wherein the teeth are provided as a first set of teeth and a second set of teeth, the teeth of the first set being interleaved with the teeth of the second set such that each tooth of the first set is located between a pair of teeth of the second set.

13. A lice comb in accordance with claim 12, wherein each tooth of the first set of teeth includes the first set of projections on both side surfaces and each tooth of the second set of teeth includes the second set of projections on both side surfaces.

14. A lice comb in accordance with claim 1, wherein the teeth of the first set are interleaved with the teeth of the second set.

15. A lice comb in accordance with claim 14, wherein the first set of projections comprise a plurality of parallel ribs extending from the upper surface of the tooth towards the lower surface of the tooth.

16. A lice comb in accordance with claim 15, wherein the second set of projections comprise a plurality of parallel ribs extending from a point below the upper surface of the tooth towards the lower surface of the tooth.

17. A lice comb in accordance with claim 14, wherein the cross sectional size of the projections of the first set reduces from the upper surface towards the lower surface.

18. A lice comb in accordance with claim 17, wherein the cross sectional size of the projections of the second set reduces from the upper surface towards the lower surface.

19. A lice comb in accordance with claim 14, wherein the length and width of each projection of the first set of projections progressively decreases toward the outer end of the teeth.

20. A lice comb in accordance with claim 19, wherein the length and width of each projection of the second set of projections progressively decreases toward the outer end of the teeth.

* * * * *